United States Patent
Lu

(10) Patent No.: US 9,828,255 B2
(45) Date of Patent: Nov. 28, 2017

(54) METHOD FOR PREPARING NANOMETER TITANIUM DIOXIDE

(71) Applicant: ZIBO SHENGTAI COMPOSITE MATERIAL TECHNOLOGY CO. LTD., Shandong (CN)

(72) Inventor: Qingchang Lu, Shandong (CN)

(73) Assignee: ZIBO SHENGTAI COMPOSITE MATERIAL TECHNOLOGY CO. LTD., Shandong (CN)

( * ) Notice: Subject to any disclaimer, the term of this patent is extended or adjusted under 35 U.S.C. 154(b) by 0 days.

(21) Appl. No.: 15/307,672

(22) PCT Filed: Apr. 27, 2015

(86) PCT No.: PCT/CN2015/077495
§ 371 (c)(1),
(2) Date: Oct. 28, 2016

(87) PCT Pub. No.: WO2015/165369
PCT Pub. Date: Nov. 5, 2015

(65) Prior Publication Data
US 2017/0050863 A1 Feb. 23, 2017

(30) Foreign Application Priority Data
Apr. 30, 2014 (CN) .......................... 2014 1 0180173

(51) Int. Cl.
C01G 23/053 (2006.01)
C01G 23/047 (2006.01)
C01G 23/08 (2006.01)
C22B 3/10 (2006.01)
C22B 3/22 (2006.01)
B82Y 30/00 (2011.01)
B82Y 40/00 (2011.01)

(52) U.S. Cl.
CPC .......... *C01G 23/053* (2013.01); *C01G 23/047* (2013.01); *C01G 23/08* (2013.01); *C22B 3/10* (2013.01); *C22B 3/22* (2013.01); *B82Y 30/00* (2013.01); *B82Y 40/00* (2013.01); *C01P 2002/74* (2013.01); *C01P 2004/01* (2013.01); *C01P 2004/64* (2013.01)

(58) Field of Classification Search
CPC ........ C01G 23/053; C01G 23/08; C22B 3/10; C22B 3/22; C01P 2004/64; C01P 2002/74; C01P 2004/01
See application file for complete search history.

(56) References Cited

U.S. PATENT DOCUMENTS
6,375,923 B1    4/2002   Duyvesteyn et al.

FOREIGN PATENT DOCUMENTS
CN    104071830    10/2014
CN    104211110    12/2014

OTHER PUBLICATIONS
Search Report dated Jun. 8, 2015.

*Primary Examiner* — James Fiorito
(74) *Attorney, Agent, or Firm* — Ipsilon USA

(57) ABSTRACT

The present invention belongs to the field of preparation technique of inorganic functional material and provides a method for preparing nanometer titanium dioxide which comprises the following steps: (1) dissolving ilmenite powder using hydrochloric acid to obtain a raw ore solution; (2) eliminating the iron element in the raw ore solution to obtain a final solution containing titanium ions; (3) heating the final solution for hydrolysis to obtain a hydrolyzed product containing titanium dioxide; and (4) calcining the obtained hydrolyzed product to obtain nanometer titanium dioxide. The present invention has the advantages that the raw materials can be easily obtained, the energy consumption is low, both rutile type titanium dioxide and anatase type titanium dioxide can be produced, and the product has high purity, small particle diameter, narrow particle diameter distribution and good dispersibility.

10 Claims, 2 Drawing Sheets

METHOD FOR PREPARING NANOMETER TITANIUM DIOXIDE

This application is a National Phase of PCT/CN2015/077495, filed on Apr. 27, 2015 which in turn claims the benefit of priority from Chinese Application No. 2014-10180173.6, the entirety of which are incorporated by reference.

FIELD OF THE INVENTION

The present invention relates to the field of preparation technique of inorganic functional material, particularly to a method for preparing nanometer titanium dioxide.

BACKGROUND OF THE INVENTION

Titanium dioxide has stable physical property and chemical property, excellent optical property and electrical property, and good pigment property, and can be widely used in various applications. Titanium dioxide has found its use in fields of paintings, plastics, rubbers, chemical fibers, paper manufacture, inks, cosmetics, toys, capacitors, display tubes, sophisticated national defense technology, foods, medicines, chemical reagents, welding electrodes, enamels, ceramics, glasses, refractory materials, metallurgy, artificial gemstones, art pigments, leathers, printing and dyeing pastes, soaps, catalysts and so on At present, the methods for preparing titanium dioxide mainly comprise chlorination process and sulfuric acid process.

The chlorination process has the advantages of advanced technology, short process flow, easily-realized automation and good product quality. However, the chlorination process puts high demands on the raw material quality and needs to use the rutile ore as the raw material which is a scarce resource. Besides, the chlorination process has technical difficulties because the materials and apparatus which are resistant to titanium tetrachloride, chlorine gas and oxygen gas should be applied when preparing titanium dioxide by the chlorination process. However, such materials and apparatus have high investment cost and difficulty in maintenance.

The sulfuric acid process has the advantages of cheap raw materials, mature process and simple apparatus. However, the process flow is long, the energy consumption is high, the amount of discharged wastes is large and the quality of product is poor.

At present, there are 47 plants which have a productive capacity of titanium dioxide of 30,000 to 150,000 tons per year in domestic, and the total productive capacity thereof is 3,500,000 tons per year. In these plants, only one plant uses the chlorination process to produce titanium dioxide, and the other plants all apply the sulfuric acid process for producing titanium dioxide. Nevertheless, these plants are still in a state of break even or under deficit due to their excess capacity of production.

Thus, how to obtain nanometer titanium dioxide with high quality under low cost is becoming a technical problem to be solved in the art.

SUMMARY OF THE INVENTION

The present invention provides a method for preparing nanometer titanium dioxide, by which manometer titanium dioxide with high quality can be obtained under low cost. The method for preparing rutile type titanium dioxide or anatase type titanium dioxide with high purity comprises the following steps, using ilmenite as the raw material, dissolving ilmenite with hydrochloric acid, then crystallizing ferrous chloride, performing oxidation, removing iron by solvent extraction, then removing silicon by gelatinization, and performing thermal hydrolysis, so that the high purity of rutile type titanium dioxide or anatase type titanium dioxide having a particle diameter of 10 to 40 nm can be obtained.

In order to achieve the above object, the present invention provides a method for preparing nanometer titanium dioxide which comprises the following steps:

(1) dissolving ilmenite powder using hydrochloric acid to obtain a raw ore solution;

(2) eliminating the iron element in the raw ore solution to obtain a final solution containing titanium ions;

(3) heating the final solution for hydrolysis to obtain a hydrolyzed product containing titanium dioxide, and (4) calcining the obtained hydrolyzed product to obtain nanometer titanium dioxide.

It is easy to understand that the step (1) is a step for dissolving ore. In the present invention, titanium tetrachloride can be obtained by using hydrochloric acid to dissolve ore, and it is further subjected to thermal hydrolysis to obtain titanium dioxide. The titanium dioxide obtained by hydrolysis is very easy to be cracked and dispersed after calcination, so as to get nanometer titanium dioxide powder. The method provided by the present invention does not set high demand on the equipment, and can produce nanometer titanium dioxide powder with high purity and high quality.

In the present invention, a specific value of the ratio of ore to acid (i.e. the ratio of the weight of ilmenite powder to the weight of hydrochloric acid) in the step (1) is not particularly limited. By using sufficient amount of hydrochloric acid, both ore-dissolving ratio and ore-dissolving degree could be increased; meanwhile the hydrolysis of titanium during ore dissolution could be prevented so as to ensure the dissolution rate of titanium. As a specific embodiment of the present invention, the amount of hydrochloric acid can be calculated according to the amount of acid-soluble substance in ilmenite and the amount of hydrogen chloride consumed thereby, as well as the desired concentration of hydrochloric acid in the titanium solution at the end of ore dissolution. Generally, it is desired that there is about 9 mol/L hydrochloric acid at the end of ore dissolution. That is to say, the mass concentration of hydrochloric acid is 30% to 38%.

If the iron content in ilmenite powder is too high, high acidity would cause precipitation of ferric chloride during ore dissolution, so that the dissolution rate would be decreased, and the precipitated ferric chloride would be removed by filtration. Therefore, the following factors must be considered together, the composition of ilmenite, the concentration of acid and the leaching temperature. In general, the ratio of ore to acid is in a range of 1:3~4 the temperature for dissolving ore is between 60° C. and 100° C. and the time for dissolving ore is between 4 h and 6 h.

The smaller the particle diameter of ilmenite powder is, the larger the dissolution rate during ore dissolution is. Preferably, the particle diameter of ilmenite powder may be 300 μm, and in such case the ore-dissolving ratio can reach 90% or more.

If hydrochloric acid with low concentration is used, a desired dissolving ratio can be acquired by conducting ore dissolution repeatedly.

In order to save cost, the hydrochloric acid of the present invention can be recovered. The recovered hydrochloric acid can be reused in the next process of preparing nanometer titanium dioxide after enrichment by hydrogen chloride.

In the present invention, the specific method for eliminating the iron element in the raw ore solution is not particularly limited, so long as the iron element in the raw ore solution could be removed and would not remain in the finally obtained nanometer titanium dioxide powder. Since the ore dissolution is performed between 60 and 100° C. using hydrochloric acid in the step (1), the ferrous ions are present in the raw ore solution. In order to save cost, the iron element can be eliminated by cooling method. Particularly, the step (2) may comprise:

(2a) crystallization of ferrous chloride: cooling the raw ore solution obtained in the step (1) to get crystalline ferrous chloride tetrahydrate, and separating crystalline ferrous chloride tetrahydrate by filtration to give a first solution;

(2b) oxygenation: oxygenating ferrous chloride remained in the first solution to ferric chloride to give a second solution, (2c) extraction: performing solvent extraction to the second solution to give a stripping solution containing ferric ions and raffinate containing titanium ions; and (2d) removal of silicon: removing silicon from the raffinate to obtain the final solution.

The ilmenite usually contains ferrous iron and ferric iron, so there are both ferrous ions and ferric ions in the raw ore solution. In order to reduce the load of solvent extraction in the step (2c), most ferrous iron has been removed by crystallization in the step (2a). The ferrous chloride tetrahydrate crystal can be precipitated when the raw ore solution is cooled to 0~4° C. in the present invention, for the purpose of description, the solution obtained after the step (2a) is referred to as a first solution. The crystalline ferrous chloride tetrahydrate in the first solution can be separated by filtration. In the step (2a), the ferrous iron would be crystallized to the maximal extent by properly injecting hydrogen chloride to increase the concentration of hydrochloric acid, and the obtained crystalline ferrous chloride tetrahydrate can produce hydrochloric acid and iron oxide by hydrolysis under high temperature. The obtained hydrochloric acid can be enriched by introducing hydrogen chloride so as to be used in the next preparation process of nanometer titanium dioxide powder, and the obtained iron oxide by hydrolysis can be used as raw material for steelmaking of steel works. Thus, it can be seen that the method for preparing nanometer titanium dioxide provided in the present invention can further decrease the produce cost.

Preferably, in the step (2a), the raw ore solution obtained in the step (1) is cooled to 0~4° C.

After crystallization of ferrous chloride, the first solution still contains a small amount of ferrous irons, which can be oxygenated to ferric irons and then removed from the first solution by extraction method so as to give a second solution. In the step (2b), the oxidizing agent can be selected from any one of chlorine gas, hydrogen peroxide and sodium chlorate, in order to conduct complete extraction, the complete oxidation of ferrous iron is very important, which can be realized by online detection and control.

The type of nanometer titanium dioxide powder obtained in the step (4) can be controlled by selecting the type of extractant and the times of extraction in the step (2c). Titanium element and ferric element can be separated by extraction.

A stripping solution containing ferric ions and raffinate containing titanium ions can be obtained by conducting extraction of the second solution by using an extractant.

The extraction process in the step (20) is solvent extraction, therefore, the selection and composition of the extractant is important due to its great effect of the extraction capacity, selectivity and layer separation velocity. Furthermore, the extraction temperature will cause viscosity change of the extraction oil phase, which will remarkably affect the extraction capacity, selectivity and layer separation velocity of the extractant. Generally, the extraction temperature should be 30° C. The oil-water ratio of the extraction stage could be selected between 1~2.

The type of the finally obtained nanometer titanium dioxide powder depends on the ingredient of the extractant. For example, when the extractant is organic oil phase containing amine extractant rutile type titanium dioxide could be obtained after once 3~3 stage continuous extraction.

The rutile type titanium dioxide has already been obtained after the step of hydrolysis of the step (3). The calcination in the step (4) can remove intermolecular water and the remaining chlorine, so as to obtain the nanometer titanium dioxide powder without water and chlorine. In such embodiment, the obtained rutile type titanium dioxide has a purity of up to 99.5% and a particle diameter of 10~40 nm.

As a preferable embodiment of the present invention, the amine extractant is tertiary amine with a general formula of $R_1R_2R_3N$, wherein $R_1$, $R_2$ and $R_3$ is linear or branched alkyl having 8~10 carbon atoms.

In addition to the amine extractant the organic oil phase containing amine extractant can further comprise diluent agent. The diluent agent may be selected from kerosene or alcohol solvent. Further, the alcohol solvent may be octanol or decanol. The proportion of each component has a wide application range, and is not critical.

In addition to titanium ions and small amount of iron ions, the raffinate phase containing, titanium ions also contains other components affecting the purity of the hydrolyzed product, such as silicon and phosphorus.

Preferably, the step (2) may further comprise (2d) removal of silicon; removing silicon in the raffinate so as to obtain the final solution. Silicon can be coagulated together by gelling process and then filtered to give the final solution.

By adjusting the step (2c), the anatase type of titanium dioxide powder can be obtained in the step (4). Specifically, the step (2c) may comprise;

$(2c_1)$ first solvent extraction performing 3~5 stage continuous extraction with the organic oil phase with amine-containing extractant to obtain a stripping solution containing ferric ions and raffinate containing titanium ions; and $(20c_2)$ second solvent extraction: performing second extraction of the raffinate containing titanium ions obtained from the first solvent extraction with oil phase containing organic phosphorous extractant, so as to give a raffinate containing titanium ions in oil phase and stripping solution containing hydrochloric acid in water phase, wherein the extraction process is 3~5 stage continuous extraction.

In such embodiment, the step $(2c_1)$ is the same as the step (2c) of preparing rutile type titanium dioxide powder, which will not be described in detail again. In the step (2d), silicon in the raffinate containing titanium ions obtained in the step $(2c_2)$ is removed.

In the step $(2c_2)$, the organic phosphorus extractant is organic phosphorus compound or mixture thereof, which has a general formula of $R_1R_2R_3PO$, wherein. $R_1$, $R_2$ and $R_3$ is linear or branched alkyl, and the sum of carbon atoms in $R_1$, $R_2$ and $R_3$ is more than 12. It is easy to understand that in the step $(2c_2)$, the oil phase containing organic phosphorus extractant further comprises diluent agent, which may be selected from kerosene or alcohol solvent. Further, the alcohol solvent may be octanol or decanol. The proportion of each component has a wide application range, and is not critical.

The water phase containing hydrochloric acid obtained in the step ($2c_2$) can be used in the next ore-dissolving step after enrichment to prepare nanometer titanium dioxide powder, thereby reducing the product cost.

The raffinate containing titanium ions obtained in the step ($2c_2$) may be hydrolyzed to obtain the anatase type titanium dioxide. After calcination, the obtained anatase type of titanium dioxide powder can have a purity of 99.8~99.9% and a particle diameter of 10~40 nm.

In the step (3) of heating the final solution for hydrolysis, it is desired to adjust the acidity of the final solution and then conduct hydrolysis.

Specifically, the step (3) may comprise:

(3a) heating the final solution obtained in the step (2d) for hydrolysis, wherein the hydrolysis temperature can be 80~110° C.; and (3b) performing acid washing and deionized water washing of the hydrolyzed product obtained in the step (3a), so as to get the titanium dioxide powder.

When the hydrolysis of the step (3a) is completed, the hydrolyzed product titanium dioxide and low concentration hydrochloric acid can be obtained by filtration. The obtained low concentration hydrochloric acid in this step can be further used in the next ore-dissolving step of the process for preparing nanometer titanium dioxide powder after enrichment.

After the step (3a), the hydrolyzed product obtained by filtration contains a certain amount of hydrolysis mother liquor, which leaves impurities in the hydrolyzed product. In order to remove the impurities in the hydrolyzed product, it is washed in the step (3b). In the present invention, dilute hydrochloric acid and deionized water are successively used for washing to maximally reduce the amount of washing liquid.

Before the beginning of the step (3), the final solution should be conducted fine filtration to prevent the formation of crystallization center by other suspended substances present in the final solution, which would affect the crystal quality of titanium dioxide.

In order to meet requirements of the product quality, the hydrolysis conditions should be controlled suitably. For example, the final solution sometimes needs to be concentrated.

The way of hydrolysis can be selected from hydrolysis by evaporation, hydrolysis by heating with controlling temperature, etc.

The hydrolysis conditions remarkably effect the quality of the hydrolyzed product, wherein the hydrolysis conditions affecting the quality of the hydrolyzed product mainly comprise acidity, the concentration of titanium on in the final solution, hydrolysis temperature, rate of temperature increase, temperature holding time of hydrolysis, quantity and quality of the seed crystal. In the present invention, the above hydrolysis conditions can be selectively controlled according to various requirements of the product quality.

In the present method, the step (3) is conducted in a hydrolysis way by forced heating with self-generating seeds, and the duality of the finally obtained nanometer titanium dioxide powder is controlled by adjusting other conditions. In general, the hydrolysis is conducted at reflux, since the critical hydrolysis temperature of the final solution is very important to the quality of the hydrolyzed product.

In order to obtain dry nanometer titanium dioxide powder, the step (4) can preferably comprise:

(4a) drying the titanium dioxide powder obtained in the step (3) under a drying temperature of 200~300° C.; and (4b) calcining the product obtained in the step (4a) under a calcining temperature of 700~800° C.

The above hydrolyzed product is already rutile type nanometer titanium dioxide or anatase type nanometer titanium dioxide, which still needs to undergo the steps of drying and calcination.

By drying under 200~300° C., the intermolecular water of the hydrolyzed titanium dioxide powder can be removed so as to obtain titanium dioxide free of water. The particle diameter of the dried titanium dioxide powder would be increased by calcining, but such increment is not remarkable in a certain range of temperature. If the calcining temperature is too high, the particles will be sintered. Thus, the calcining temperature must be controlled strictly. Preferably, in the step (4b), the calcining temperature is 300~900° C., which will not only prevent excess growth or sinter of the nanometer titanium dioxide particles, but also decrease the chlorine content in the nanometer titanium dioxide powder.

Certainly, the step (4) may also comprise directly calcining the product obtained in the step (3) under the calcining temperature of 300~900° C.

In order to get the nanometer titanium dioxide powder with good dispersibility, preferably, the method may also comprise: (5) crashing the product obtained in the step (4) to get dispersed nanometer titanium dioxide powder.

It is easy to crash the product obtained in the step (4), so as to give titanium dioxide powder with good dispersibility.

The present invention has the following advantages:

1. The raw material is easily available, even can be low grade ilmenite, which is used for steel making and fails to work since the presence of titanium would cause the wall accretion of blast furnace, but can be used in the present invention and the price thereof is only half of that of the normal ilmenite;

2. The energy consumption is small because low reactive temperature (below 100° C.) is applied during the production;

Both rutile type titanium dioxide and anatase type titanium dioxide can be produced, and the rutile type product can be obtained through direct hydrolysis without calcining;

4. The product has high purity up to 99.5~99.9%;

5. The particle diameter is small, the particle diameter distribution is narrow and the dispersibility is good;

6. The reactive condition is mild and the process is easy to control.

7. The apparatus is simple and the investment cost is low.

8. The filter residue of ore-dissolving is used for constructional material, hydrochloric acid is recovered through the hydrolysis of the separated ferric chloride, the obtained iron oxide is used as the raw material of steelwork in group company, the other stuffs can be recycled, and there is no discharge;

9. One obvious advantage of the present invention is the use of hydrogen chloride, which increases the dissolving rate in the ore dissolution to up to 98%, meanwhile enriches the recovered low concentration hydrochloric acid to realize full utilization thereof; and 10. Another obvious feature of the present invention is the application of solvent extraction which makes titanium dioxide having better purity. The present invention has accomplished pilot production and is proved feasible, thus possessing apparent advantage.

DESCRIPTION OF THE FIGURES

The accompanying drawings, which provide a further understanding of the present invention and constitute a part of the specification, are intended to illustrate the present invention together with the specific embodiment below, and are not intended to limit the present invention, in these figures.

DETAILED DESCRIPTION OF EMBODIMENTS

Figure 1:
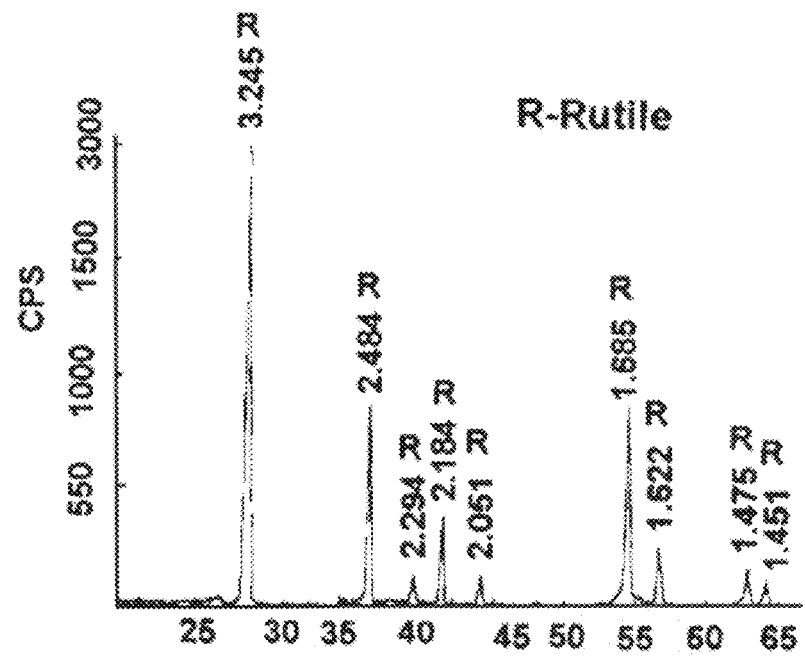
FIG. 1 is XRD pattern of the rutile type of nanometer titanium dioxide powder prepared by the method provided in Example 1 of the present invention.

The specific embodiments of the present invention will be described below in details with reference to the accompanying drawings. It should be understood that, the specific embodiments described herein are merely for explanation or description of the present invention and do not intend to limit the present invention.

Example 1

(1) 200 kg ilmenite powder with a particle diameter of 200 mesh was put into a 1000 L glass-lined reactor, to which 800 kg of 31% hydrochloric acid was added, then the reactor was closed. The reactor was heated to 100° C. using steam jacket and stirred over 4 h for dissolution, then was cooled to 30° C. by jacket cooling water. After filtration with sealed leak-free plate and flame filter, a clear and transparent raw ore solution was obtained. Through detection and material balancing calculation, the concentration of titanium ions was 65.33 g/L, the total concentration of iron ions was 55.88 g/L wherein the concentration of ferrous ions was 41.39 g/L, and the dissolution rates of titanium and iron were 94.21% and 96.23% respectively.

(2) The iron element in the raw ore solution was removed to give a final solution containing titanium ions, specifically comprising:

(2a) the above raw ore solution was cooled to 0° C. for crystallization, and then ferrous chloride tetrahydrate was filtered to obtain a first solution;

(2b) the first solution was oxygenated using stoichiometric chlorine gas and heated to 60° C. under stirring so as to completely oxygenate the divalent iron and remove the remaining chlorine, then it was reduced to remove the remaining chlorine, and cooled to room temperature, thereby obtaining a second solution in which the iron ion was ferric ion.

(2c) the second solution was subjected to three-stage continuous extraction and stripping using organic oil phase containing amino extractant to give a stripping solution containing ferric ions and raffinate containing titanium ions; and (2d) anionic polymeric flocculent was added into the raffinate under stirring, and the raffinate was filtered to give the final solution, wherein the concentration of titanium ions was 62.05 g/L, the concentration of ferric ions was 0.40 g/L, and acid concentration was 6.66 mol/L.

(3) The final solution was heated for hydrolysis so as to obtain hydrolyzed product containing titanium dioxide, specifically comprising.

(3a) hydrolysis in reflux was conducted under forced heating at a hydrolysis temperature 66° C. for a hydrolysis time 3 h, then the temperature was decreased, and the hydrolysis rate was measured 97% by sampling; and (3b) the hydrolyzed product was filtered and washed with dilute hydrochloric acid, and then the hydrolyzed product washed with dilute hydrochloric acid was washed again with deionized water.

(4) The hydrolyzed product which had been washed in the step (3b) was calcinated at 900° C. for 2 h.

(5) The calcinated product of the step (4) was crashed.

The components of the organic oil phase containing amine extractant used therein were: tertiary amine/octanol/kerosene=45 wt %:5 wt %:50 wt %.

Example 2

The nanometer titanium dioxide powder was prepared according to the same steps in Example 1, except that the step (2c) comprised:

($2c_1$) the second solution was conducted three-stage continuous extraction with organic oil containing amine extractant so as to give a stripping solution containing ferric ions and raffinate containing titanium ions;

($2c_2$) second solvent extraction: the raffinate containing titanium ions obtained in the step ($2c_1$) was conducted second extraction with oil phase containing organic phosphorous extractant, so as to give raffinate containing titanium ions in oil phase and a stripping solution containing hydrochloric acid in water phase, wherein the extraction process is three-stage continuous extraction; and ($2c_3$) the extracted oil phase was washed to further remove impurities, and then was subjected to five-stage stripping and followed fine-filtrated to remove impurities so as to get the final solution containing titanium ions. Upon detection, the concentration of titanium ions in the final solution was 33.02 g/L, the ferric ions were not detected, and acid concentration was 6.62 mol/L.

In the step (3), the hydrolysis temperature was 90° C., the hydrolysis time was 3 h. Then the temperature was decreased, and the hydrolysis rate was measured 98% by sampling.

In the step ($2c_1$), components of the organic oil phase containing amine extractant were: tertiary amine/octanol/kerosene=45 wt %:5 wt %:50 wt %. In the step ($2c_2$), components of the oil phase containing organic phosphorus extractant were: organic phosphorus extractant/octanol/kerosene=20 wt %:15 wt %:65 wt %.

The crystallized ferrous chloride crystal in the above example was mixed with the stripping solution of first extraction (the solution containing ferric ion) to give a solution which contained ferrous iron of 20.3 g/L, total iron of 42.15 g/L and titanium of 0.5 g/L, and then the solution was hydrolyzed with distilled water to give solid ferric oxide, and the gas phase was cooled and collected to obtain 16% of hydrochloric acid.

Test Example 1

Figure 2:
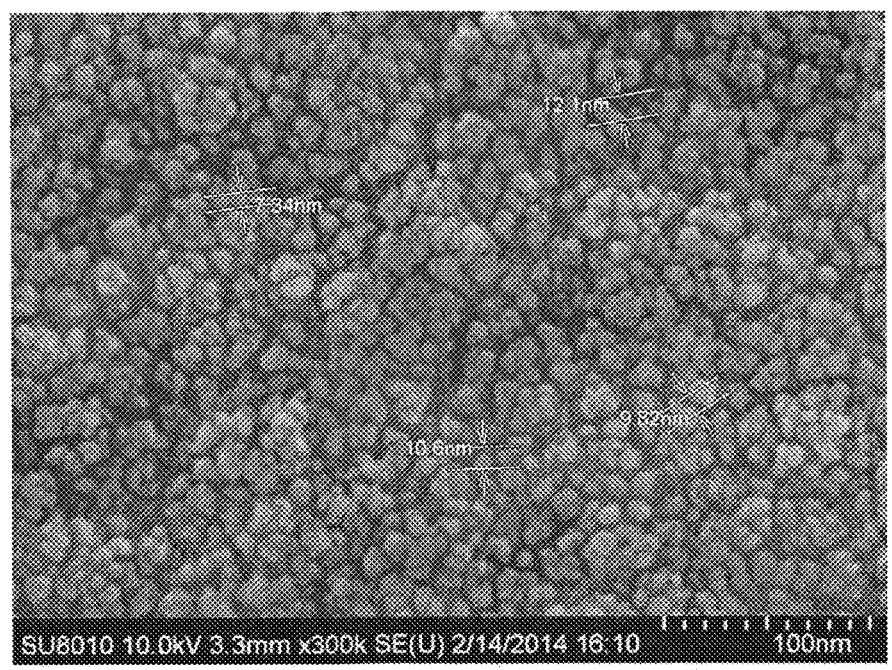
FIG. 2 is scanning graph of the rutile type of nanometer titanium dioxide powder prepared by the method provided in Example 1 of the present invention.

For the Example 1, the purity of titanium dioxide is 99.52% measured by XRD, and the composition analysis is shown in Table 1, Example 1. The nanometer titanium dioxide powder of Example 1 is rutile type, and has a particle diameter of about 10 nm observed in the scanning electron microscopy photo, as seen in FIGS. 1 and 2.

Test Example 2

Figure 3:
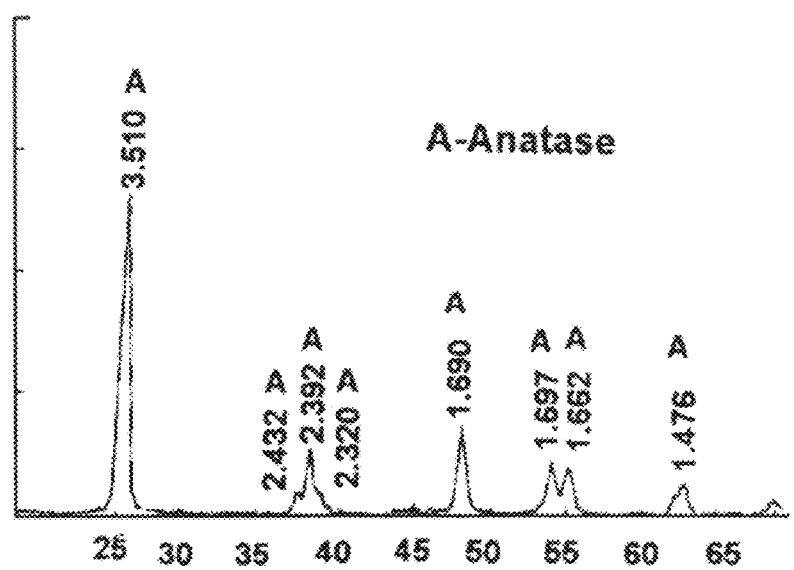
FIG. 3 is XRE pattern of the anatase type of nanometer titanium dioxide powder prepared by the method provided in Example 2 of the present invention.
Figure 4:
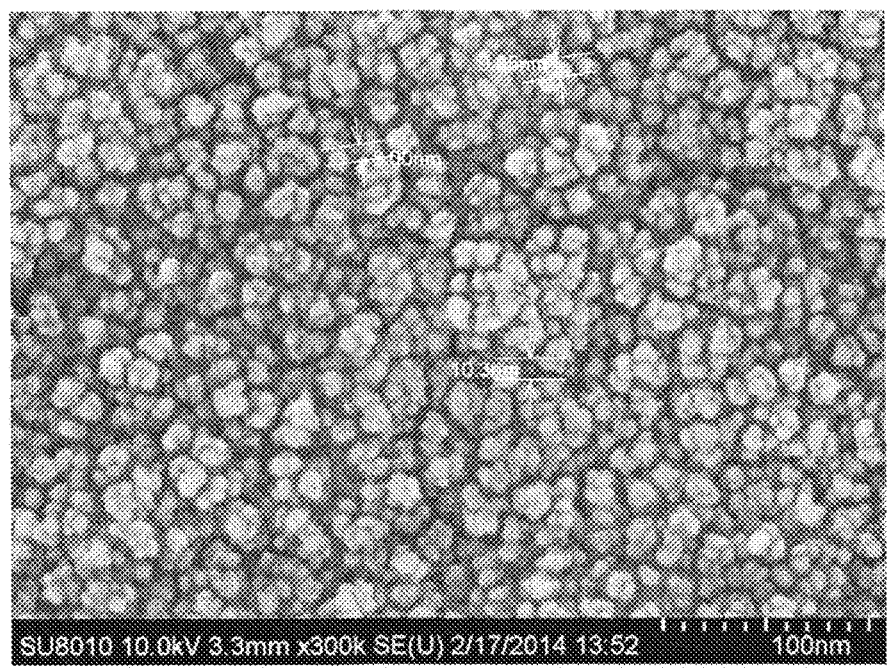
FIG. 4 is scanning graph of the anatase type of nanometer titanium dioxide powder prepared by the method provided in Example 2 of the present invention.

For the Example 2, the purity of titanium dioxide is 99.91% measured by XRD, and the composition analysis is shown in Table 1, Example 2. The nanometer titanium dioxide powder of Example 2 is anatase type, and has a particle diameter of about 10 nm observed in the scanning electron microscopy photo, as seen in FIGS. 3 and 4.

TABLE 1

| No. | Composition | | | | | | | | |
|---|---|---|---|---|---|---|---|---|---|
|  | MgO (wt %) | $Al_2O_3$ (wt %) | $SiO_2$ (wt %) | $P_2O_5$ (wt %) | $SO_3$ (wt %) | CaO (wt %) | $TiO_2$ (wt %) | $Fe_2O_3$ (wt %) | Cl (wt %) |
| Example 1 | 0.020 | 0.044 | 0.090 | 0.245 | 0.045 | 0.015 | 99.521 | 0.0008 | 0.016 |
| Example 2 | 0.001 | 0.015 | 0.019 | 0.033 | 0.006 | 0.013 | 99.912 | 0.0004 | 0.003 |

It should be understood that the embodiments described above are merely the exemplary embodiments for the purpose of illustrating the principles of the present invention, which shall not limit the scope of the invention. Various changes and modifications to the present invention made without departing from the scope and spirit of invention by a person skilled in the art should all be covered in the protection scope of the present invention.

The invention claimed is:

1. A method for preparing nanometer titanium dioxide, characterized in that, it comprises the following steps:
   (1) dissolving ilmenite powder using hydrochloric acid to obtain a raw ore solution;
   (2) eliminating the iron element in the raw ore solution to obtain a final solution containing titanium ions;
   (3) heating the final solution for hydrolysis to obtain a hydrolyzed product containing titanium dioxide; and
   (4) calcining the obtained hydrolyzed product to obtain nanometer titanium dioxide;
   in the step (1), the temperature for dissolving ore is 60~100° C.; and
   the step (2) comprises:
   (2a) crystallization of ferrous chloride: cooling the raw ore solution obtained in the step (1) to get crystalline ferrous chloride tetrahydrate, and separating crystalline ferrous chloride tetrahydrate by filtration to give a first solution;
   (2b) oxygenation: adding oxidizing agent to the first solution to oxygenate ferrous chloride remained in the first solution to ferric chloride so as to give a second solution;
   (2c) extraction: performing solvent extraction to the second solution to give a stripping solution containing ferric ions and raffinate containing titanium ions; and
   (2d) removal of silicon: removing silicon from the raffinate to obtain the final solution by adding gelling agent to the raffinate obtained from the step (2c) to precipitate silicon in the raffinate, and then filtering off the precipitate to obtain the final solution;
   wherein the step (2c) comprises performing 3~5 stage continuous extraction using organic oil phase containing amine extractant, the nanometer titanium dioxide obtained in the step (4) is rutile type titanium dioxide;
   wherein the step (2c) comprises the following steps ($2c_1$) and ($2c_2$), and in the step (2d), silicon in the raffinate containing titanium ions obtained in the step ($2c_2$) is removed; the nanometer titanium dioxide obtained in the step (4) is anatase type titanium dioxide powder:
   ($2c_1$) first solvent extraction: performing 3~5 stage continuous extraction to the second solution with the organic oil phase comprising amine-containing extractant to obtain a stripping solution containing ferric ions and raffinate containing titanium ions; and
   ($2c_2$) second solvent extraction: performing second extraction to the raffinate containing titanium ions obtained in the step ($2c_1$) with oil phase containing organic phosphorous extractant, so as to give raffinate containing titanium ions in oil phase and a stripping solution containing hydrochloric acid in water phase, wherein the extraction process is 3~5 stage continuous extraction
   such that in the step (2d), silicon in the raffinate containing titanium ions obtained in the step ($2c_2$) is removed.

2. The method for preparing nanometer titanium dioxide according to claim 1, characterized in that, in the step (1), the mass concentration of hydrochloric acid is 30%~38%, and the mass ratio of ilmenite powder to hydrochloric acid is in a range of 1:3~5.

3. The method for preparing nanometer titanium dioxide according to claim 1, characterized in that, in the step (2a), the raw ore solution obtained in the step (1) is cooled to 0~4° C.

4. The method for preparing nanometer titanium dioxide according to claim 1, characterized in that, the oxidizing agent selected in the step (2b) is any one of sodium chlorate, hydrogen peroxide and chlorine gas.

5. The method for preparing nanometer titanium dioxide according to claim 1, characterized in that, the organic phosphorus extractant includes organic phosphorus compound or mixture thereof, which has a general formula of $R_1R_2R_3PO$, wherein $R_1$, $R_2$ and $R_3$ is linear or branched alkyl, and the sum of carbon atoms in $R_1$, $R_2$ and $R_3$ is more than 12.

6. The method for preparing nanometer titanium dioxide according to claim 1, characterized in that, the amine extractant includes tertiary amine with a general formula of $R_1R_2R_3N$, wherein $R_1$, $R_2$ and $R_3$ is linear or branched alkyl having 8~10 carbon atoms.

7. The method for preparing nanometer titanium dioxide according to claim 1, characterized in that, the step (3) comprises:
   (3a) heating the final solution obtained in the step (2d) for hydrolysis, wherein the hydrolysis temperature is 80~110° C.; and
   (3b) performing acid washing and deionized water washing of the hydrolyzed product obtained in the step (3a), so as to get the titanium dioxide powder.

8. The method for preparing nanometer titanium dioxide according to claim 1, characterized in that, the step (4) comprises:
   (4a) drying the titanium dioxide powder obtained in the step (3) under a drying temperature of 200~300° C.; and
   (4b) calcining the product obtained in the step (4a) under a calcining temperature of 800~900° C.

9. The method for preparing nanometer titanium dioxide according to claim 1, characterized in that, the step (4)

comprises: calcining the titanium dioxide powder obtained in the step (3) under a calcining temperature of 800~900° C.

10. The method for preparing nanometer titanium dioxide according to claim 1, characterized in that, the method further comprises:
(5) crushing the product obtained in the step (4) to get dispersed nanometer titanium dioxide powder.

* * * * *